Oct. 3, 1961 A. H. FAULKNER 3,003,039

REGISTER-TRANSLATOR-SENDER ARRANGEMENTS

Filed April 8, 1960 3 Sheets-Sheet 1

INVENTOR.
Alfred H. Faulkner
BY C. A. Gulbrandsen
Atty.

Oct. 3, 1961 A. H. FAULKNER 3,003,039

REGISTER-TRANSLATOR-SENDER ARRANGEMENTS

Filed April 8, 1960 3 Sheets-Sheet 2

INVENTOR.
Alfred H. Faulkner
BY C. A. Cullwander
Atty.

Oct. 3, 1961 A. H. FAULKNER 3,003,039

REGISTER-TRANSLATOR-SENDER ARRANGEMENTS

Filed April 8, 1960

3 Sheets-Sheet 3

INVENTOR.
Alfred H. Faulkner
BY C. A. Gulbrandsen
Atty.

3,003,039
Patented Oct. 3, 1961

3,003,039

REGISTER-TRANSLATOR-SENDER ARRANGEMENTS

Alfred H. Faulkner, Redondo Beach, Calif., assignor to Automatic Electric Laboratories, Inc., Northlake, Ill., a corporation of Delaware Filed Apr. 8, 1960, Ser. No. 21,038
15 Claims. (Cl. 179—18)

Figure 1:
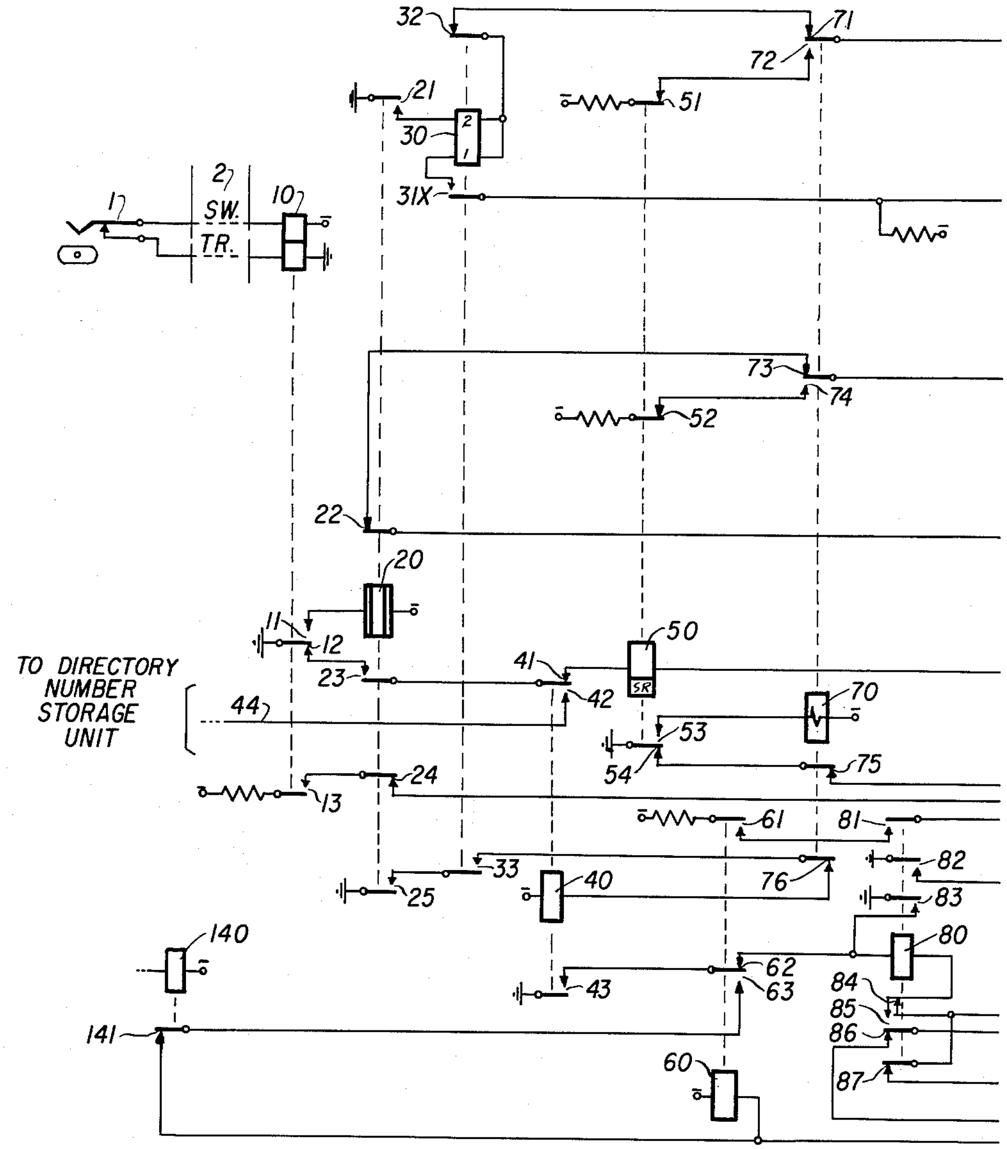

The invention relates generally to register-sender arrangements and, more specifically register-translator-sender arrangements in telephone systems. In particular, this invention relates to register-translator-sender arrangements wherein a number of register-senders are selectively connectable with a common translator.

Generally, in arrangements of this kind the first two or three or more digits dialled by the subscriber are code digits used to direct the call to the terminal office. That is, these code digits are converted or translated into a number of routing digits which serve to set the switching equipment involved in routing the call to the called subscriber's office. The actual routing of the call may require as many as seven or more digits, depending upon the number of switches which are to be controlled.

For the purposes of this specification, it will be assumed that seven-digit subscriber numbers are used of which the first three digits will be referred to as the office code digits and the remaining four digits as the directory number. Assuming that a call requiring the service of a register-sender is placed, the office code portion of the number is stored in an office code register and the directory number portion is stored in a directory number register. After storage of the office code, the register taken into use is connected with a common translator, if or when available this translator functions to translate the office code into routing directive markings which are passed on to the sender in question. The sender utilizes these markings to generate the appropriate routing digits. After connection with the desired exchange is made, the directory number register is accessed by the sender and the digits of the directory number are transmitted without translation.

It is an object of this invention to provide in a register-sender arrangement for telephone systems, improved and simplified means for sequentially storing a series of decimal digits in coded form.

Another object of this invention is to provide an improved register-translator arrangement employing a translator common to a plurality of register-senders.

A further object of this invention is to provide a novel and improved register-translator-sender arrangement wherein magnetic-core memory is used to store a sequence of digits in coded form.

Another object of this invention is to provide novel and improved means in a register-translator-sender arrangement to facilitate alternative coded translation, for example in the event of an all-trunks-busy condition.

An additional object is to provide in a telephone system a register-sender arrangement using a type of register in which the recorded information is destroyed upon read-out, and having facility to re-record information according to the destination to the core in the register for re-use by the sender, such as, for example, for the purpose of alternative routing.

Another object of this invention is to provide a register arrangement wherein destination information for a call may be recorded in the storage unit of the register either sequentially, digit-by-digit, or in parallel, all digits simultaneously.

In the embodiment of the invention disclosed herein there is provided an office code register-sender storage unit which utilizes magnetic cores as storage elements. The office code digits which, through the medium of a single rotary switch are sequentially stored in this magnetic memory in a two-out-of-five code are detected by transistor flip-flops in the translator, the information stored in the cores being destroyed incident to this read-out. The detected signals are then passed through a decoding array of diode "and" gates and a transistor amplifier to the particular translating relay which corresponds to the set of office code digits dialled. The selected translating relay then provides the sender, through the medium of a cross-connecting or translating field with a combination of marking potentials which, in a manner well known in the art, causes the sender to transmit a predetermined series of routing digits to the switching equipment. In addition, the translating relay acts to re-mark memory cores with the same or alternative code. This feature may be advantageously employed for alternative routing in case of an all-trunks-busy condition or for toll-ticketing purposes.

Accordingly a feature of this invention is the use of a single, multi-bank rotary switch with the dual purpose of converting the received decimal impulses into coded form and of sequentially supplying the coded digits to the corresponding storage units of the register. Preferably, magnetic cores are used as the storage elements.

An associated feature of this invention is the provision in a register-translator-sender of means in the translator for automatically rewriting a series of office code digits into a magnetic core-type register after the information originally stored in the register has been destructively read out into the translator, namely for the purpose of renewed transmission of digits by the sender.

Figure 2:
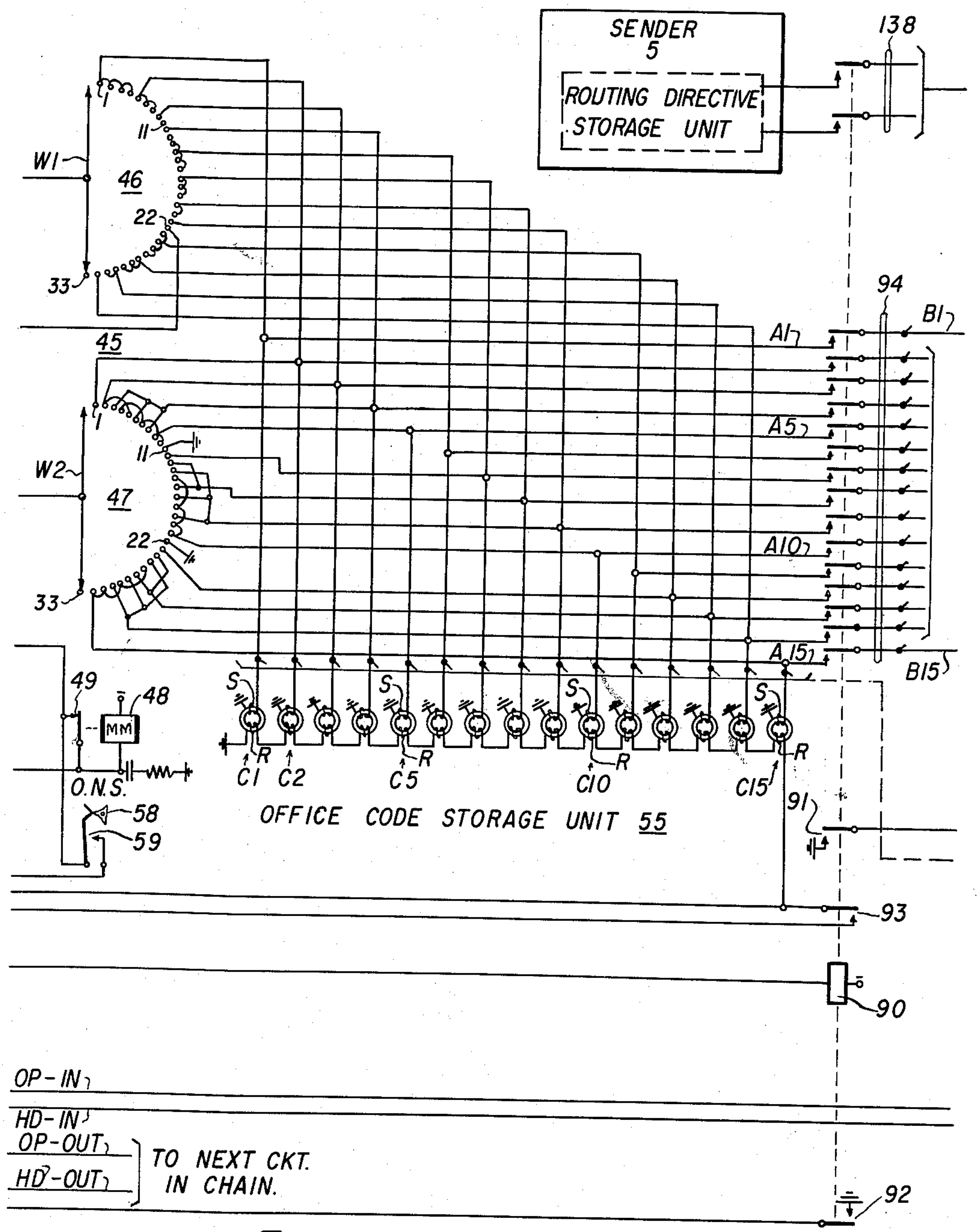
Figure 3:
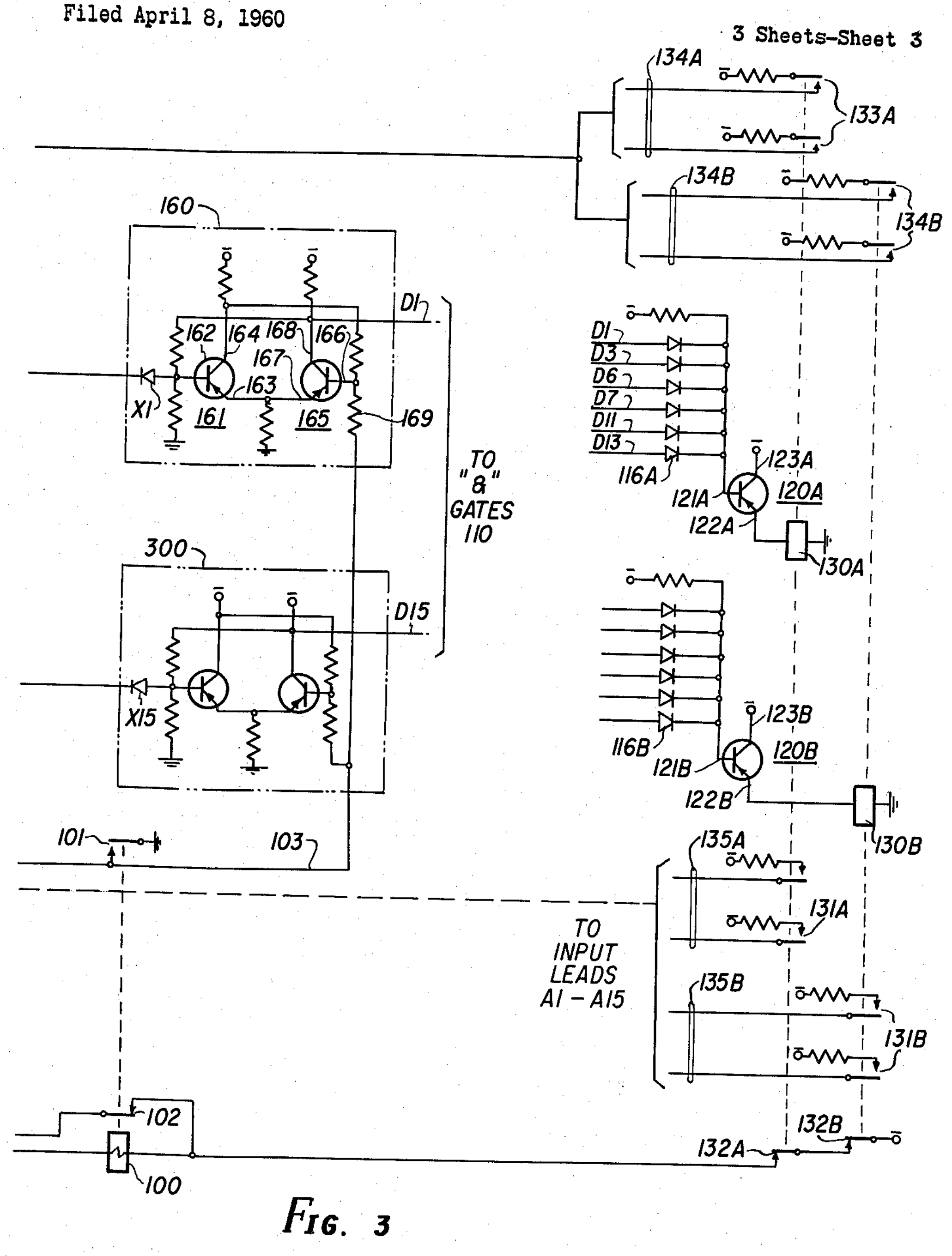

Other objects and features of this invention will be apparent upon a reading of the specification in conjunction with the drawings. The drawings comprise FIGS. 1, 2 and 3, which when placed as described below, depict the schematic diagram of a register translator circuit embodying the features discussed above. The drawings should be placed so that FIG. 1 is to the left, FIG. 2 is to the right of FIG. 1, and FIG. 3 is to the right of FIG. 2 with the corresponding lines in the several figures in alignment.

A brief description of the system, schematically shown in the drawings, is contained in the following paragraphs. For simplicity only the portions of the register-sender necessary to clearly describe the invention are shown in the drawing. In the register-sender 3, a two-deck, 33-point rotary switch, 45, converts office code digital impulses into "two-out-of-five" combinational code markings. An office code storage unit 55, consisting of three groups of five magnetic cores each (C1–C5, C6–C10, and C11–C15), is accessed from the rotary switch. The selective accessing of the three groups of cores is accomplished automatically in response to the "stepping" of the rotary switch. Each magnetic core has a setting winding S and a read-out winding R. The setting windings S are connected to the banks of rotary switch 45 in accordance with the combinational code requirements, and the read-out windings R are connected in series. Initially, all cores are driven to saturation in one magnetic direction by passing current through the serially connected read-out windings.

The following table sets out the code utilized in this system. Since each of the three core groups is identical, only the code arrangement for the first group is shown.

| Digit: | Cores marked |
|---|---|
| 1 | C1–C2 |
| 2 | C1–C3 |
| 3 | C1–C4 |
| 4 | C1–C5 |
| 5 | C2–C3 |
| 6 | C2–C4 |
| 7 | C2–C5 |
| 8 | C3–C4 |
| 9 | C3–C5 |
| 0 | C4–C5 |

Registration of the first digit occurs when two cores in the C1–C5 group are marked according to the code. A core is marked by passing current through its setting winding to reverse the direction of its magnetic saturation. Subsequent digits are stored in the other core groups by reversing the direction of saturation in the appropriate two out of the five cores in each of these groups.

While the rotary switch 45 used in this register-sender is designed to register a three digit office code, the system could obviously easily be modified to provide for the registration of a greater or smaller number of digits. Rotary switch 45 has two decks 46 and 47, each having thirty-three bank contacts, which are accessed by wipers W1 and W2 respectively, and is equipped with a three position off-normal cam 58 which operates its associated contact 59 on steps 11, 22, and 33. Wipers W1 and W2 of rotary switch 45 are stepped in unison by motor magnet 48 under control of incoming digital impulses, and during the first interdigital pause, marking circuits are completed through these switch wipers to set two of the five cores C1–C5. After marking, the wipers are stepped automatically until bank contact 11 is reached, whereupon off-normal cam 58 operates to prevent further stepping. The second digit is registered in a similar manner, after which the switch wipers are automatically stepped to the 22nd bank contact. During storage of the third digit, a relay (30) prepares a circuit for routing the fourth and subsequent digits to the directory number storage unit (not shown).

The translator 4 comprises a group of flip-flop detecting circuits 160, 170, 180, . . . 300, the outputs D1–D15 of which are connected to a plurality of diode "and" gates, 110A, B, etc. Each "and" gate is responsive to markings on the output leads of a predetermined combination of six flip-flops. For example, "and" gate 110A in the drawings will only respond when office code number 212 is registered. A transistor-operated translating relay 130A, B, etc. is connected to each "and" gate and is controlled thereby.

Each translating relay has a plurality of contacts 133A, B, etc. for connecting resistance battery to a routing directive storage unit 5 located in the sender portion (not shown) of the register-sender 3. The manner in which the leads 134A, B, etc. connected to the translating relay contacts are strapped to the leads 138 associated with the routing directive storage unit of the sender 5 determines the routing directive for the particular office code number dialled by the subscriber. For example, the contacts 133A of translating relay 130A may be strapped in such a manner that, upon registration of office code 212, routing directive 583 is stored in routing directive storage unit 5.

Translator 4 is common to a group of register-senders and consequently provision is made to guard against its seizure by more than one register-sender. This is accomplished by a chain circuit, the first link of which includes relay 80 in FIG. 1. The corresponding circuit in the next register-sender 3' has its OP–IN and HO–IN leads (associated with its relay 80') connected to the OP–OUT and HO–OUT leads of the drawings. In effect, the circuit of relay 80' includes the break contacts of relay 80. The same is true for other register-senders, the last in the chain having its corresponding "relay 80'''" circuit completed serially through all of the preceding "relay 80'''" break contacts. Therefore, the operation of relay 80 or any of the relays 80' prevents the seizure of the translator by the other register-senders.

After registration of the office code number, the register-sender seizes the translator when it is available. Transfer leads A1–A15 are connected to input leads B1–B15 of flip-flops 160, 170, 180, . . . 300. Battery is connected to the serially connected read-out windings R of cores C1–C15. The reversal of flux in the marked cores generates negative voltage pulses across their S windings, and the corresponding flip-flops switch. Responsive to the particular combination of flip-flops switched, one of the "and" gates 110A, B, etc. operates and translation takes place. Obviously, in this type read-out system, information stored in the cores is erased upon extraction.

Since it is often desirable to preserve this stored information, a rewrite feature is embodied in this invention. With this feature, the original information, or different information, may be rewritten in storage unit 55. The rewriting is accomplished just before the translator is released by connecting battery, through another set of contacts 131A, B, etc. on the corresponding translating relay, to selected ones of input leads B1–B15. A more complete explanation of this rewrite feature, and of the invention as a whole, is given in the detailed description which follows.

Upon seizure of the subscriber's line, a circuit is completed to relay 10 via line-finder switch train 2 and contact 1 of the subscriber's dial. Relay 10 operates and completes an operating circuit for relay 20 at contact 11. At contact 13, battery is momentarily connected via contact 24 to the serially connected read-out windings R of cores C1–C15, thus insuring that all of the cores are initially set in the unmarked direction. Relay 20 in operating, opens the above path at contact 24.

The subscriber dials the first digit of the office code which for purposes of illustration will be assumed to be a 2. Contact 1 opens the line loop and relay 10 restores. Relay 10 in restoring completes a circuit extending over ground, contact 12, contact 23, contact 41, relay 50, motor magnet 48, and battery. Through this circuit both relay 50 and motor magnet 48 operate. Relay 50, in operating, closes an operating path to relay 70.

Rotary switch 45 is driven by motor magnet 48, its wipers being stepped upon restoration of the motor magnet. The bank contacts of the switch are interconnected to convert decimal digital impulses into the "two-out-of-five" combinational code as indicated previously.

Contact 1 recloses, reoperating relay 10. Motor magnet 48 restores, stepping switch wipers W1 and W2 to their respective first bank contacts, but relay 50 remains operated due to its slow-to-release feature. Contact 1 opens for the second time and again restores relay 10. Motor magnet 48 reoperates. Contact 1 recloses and remains closed until the next digit is dialled. Relay 10 reoperates and restores motor magnet 48 which steps switch wipers W1 and W2 to their second bank contacts. After passage of its slow-to-release time, relay 50 restores and causes relay 70, which is also slow-to-release due to a non-inductive winding shunting its magnetizing winding, to restore. During the interval between the restoration of relay 50 and the restoration of relay 70, marking circuits are closed to switch wipers W1 and W2 to set magnetic cores C1 and C3 in the office code storage unit 55. These marking circuit paths are as follows:

(1) Resistance battery, contact 51, contact 72, wiper W1, contact 2 of switch bank 46, contact 1 of switch bank 46, setting winding on core C1 and ground; and (2) Resistance battery, contact 52, contact 74, wiper W2, contact 2 of switch bank 47, setting winding on core C3, and ground.

On current flow over these paths, magnetic cores C1 and C3 are magnetically set in a direction opposite to that in which all of the cores were originally set.

With the restoration of relays 50 and 70 a path is completed from ground, contact 54, contact 75, off-normal contact 59, interrupter spring 49, motor magnet 48, to battery. Over this path motor magnet 48 operates in a self-interrupted manner to step wipers W1 and W2 to their respective eleventh bank contacts, whereupon off-normal cam 58 operates its contact 59 to stop further stepping of the switch wipers. The register is now ready to receive another digit.

Assume the second digit to be a 1. Contact 1 restores and relay 50 is again operated in series with motor magnet 48. Relay 50, in operating, operates relay 70. Contact 1 recloses reoperating relay 10. Motor magnet 48 restores, stepping switch wipers W1 and W2 to their respective twelfth bank contacts. After its slow-to-release time relay 50 restores and the previously described marking circuits are completed during the release time of relay 70 to set cores C6 and C7. Upon the release of relay 70, motor magnet 48 again operates in a self-interrupted manner to step switch wipers W1 and W2 to their 22nd bank contacts, whereupon off-normal cam 58 opens its contact 59 and prevents further stepping. It will be noted that resistance battery is connected to contact 22 of bank 46, which energizes one winding of relay 30 over a path including resistance battery, contact 22, wiper W1, contact 71, contact 32, the number 2 winding of relay 30, contact 21, and ground. Relay 30 operates its contact 31X only, which shunts its number 1 winding down, and prepares itself for complete contact closure upon receipt of the next digital impulse.

The subscriber dials the third digit which is also assumed to be a 2. Contact 1 opens, restoring relay 10 which operates relay 50 in series with motor magnet 48. Relay 50 again completes an operating path to relay 70 which opens the original operating path of relay 30 at contact 71, thereby removing the short circuit across winding 1 of this relay. Now both windings of relay 30 are placed in series across resistance battery and relay 30 operates completely. This path extends over resistance battery, contact 31X, windings 1 and 2 of relay 30 (in series aiding), contact 21, and ground. Relay 10 follows the opening and closing of dial contact 1 causing motor magnet 48 to step switch wipers W1 and W2 to their 24th contacts. Again, during the interdigital pause, the previously described marking circuits are completed, upon release of relay 50, to mark cores C11 and C13.

When relay 70 restores motor magnet 48 is again operated in a self-interrupted manner to step switch wipers W1 and W2 to their 33rd or home bank contacts whereupon off-normal cam 58 operates its contact 59 to prevent further stepping of the switch wipers. Relay 70, in restoring, also completes an operating path for relay 40. This path may be traced through ground, contact 25, contact 33, contact 76, relay 40, and battery.

This completes the registration of the office code digit portion of the number. Relay 40 in operating closes its contacts 42 to route subsequent digits of impulses over lead 44 to the directory number registers (not shown). Relay 40 also prepares an operating path for relay 80 which path will be completed if or when translator 4 is available. Assuming that translator 4 is idle, relay 40 in operating completes an operating path for relay 80 through ground, contact 43, contact 62, relay 80, contact 84, contact 102, contacts 132A, B, . . . and battery. Relay 80 operates and at its make-before-break contacts 84 and 85, places itself in series with relay 100 in the translator. Relay 100 now operates. At contacts 86 and 87, relay 80 prevents operation of similar relays in other register-senders associated with this translator. At contact 83 it completes a holding path for itself, and at contact 82 completes an operating path for relay 90.

Relay 90, in operating closes its group of contacts 94 which connects the setting windings S of cores C1–C15, inclusive, via transfer leads A1–A15, inclusive, and input leads B1–B15 to respective ones of the flip-flop detecting circuits 160 through 300 in the translator. At contact 93, relay 90 prepares a circuit for reading out the information stored in cores C1 through C15, and at contact 92 completes an operating path for relay 60. Relay 60, in operating, at contact 63 establishes a holding path for itself and at contact 61 connects resistance battery to the serially connected read-out windings R of cores C1 through C15 to effect read-out of the marked cores.

As mentioned previously, translator 4 includes flip-flop detecting circuits 160, 170, 180, . . . 300. Taking flip-flop circuit 160 as an example, it includes a pair of transistors 161 and 165 having base, emitter, and collector electrodes 162, 163, 164 and 166, 167, 168 respectively. Normally, that is, with ground absent from lead 103 transistors 161 and 165 are connected as a mono-stable flip-flop. In this normal condition transistor 165 is conductive and transistor 161 is non-conductive. This same condition prevails in all of the flip-flops 160 through 300. Output leads D1–D15 are connected to collectors 168 and 308 respectively, and at their other ends these leads are connected in different combinations to a number of "and" gates 110A, B, . . . . The number of these "and" gates is dependent upon the number of translations required, but for simplicity, only two "and" gates 110A and 110B are shown.

"And" gate 110A is representative and comprises a number of diodes 116A having their negative terminals connected to base 121A of translating transistor 120A. Emitter 122A of transistor 120A is connected to a translation relay 130A, and collector 133A is connected to battery. As described more fully hereafter, transistor 120A is normally non-conductive due to the diodes of its "and" gate 110A being conductive because of near-ground potential applied thereto through the output circuit of the conductive transistors, such as 165. However when all of the inputs to diodes 116A are blocked, that is, due to the application thereto of negative potential by the associated flip-flop, negative battery will be impressed upon base 121A of transistor 120A which will render it conductive. Transistor 120A, in conducting, will operate translation relay 130A.

When relay 100 in the translator operated, it connected ground potential to base resistors 169, 179, 189, . . . 309 of transistors 165, 175, 185, . . . 305 respectively. This ground potential is effective to convert the normally monostable flip-flops 160, 170, 180, . . . 300 into bistable flip-flops. At this time, as indicated above, since all of the right hand transistors, as viewed in FIG. 3, of the flip-flops are conducting, their collector potentials, and hence the potentials on output leads D1 through D15, are very near to ground potential. Since the diode "and" gates require negative potential on their inputs to be operative, no translating transistors are conductive.

Returning now to the time when relay 60 operated, resistance battery was connected to a circuit including contact 61, contact 81, contact 93, the serially connected read-out windings R of cores C1 through C15 and ground. The direction of current flow through these windings is such as to tend to establish flux in the direction in which the cores were originally set, that is, before write-in. Therefore, the marked cores, which have been subsequently set in the opposite direction, experience a flux reversal, and hence, a potential is induced across their setting windings S. These negative potentials appear on corresponding ones of transfer leads A1–A15 and are impressed via input leads B1–B15 upon input diodes X1–X15, inclusive, of flip-flops 160, 170, 180, . . . 300. Since these flip-flops are now bistable, application of a negative pulse to the bases of their left-hand transistors results in switching of these non-conducting transistors.

Since the registered number was assumed to be 212, cores C1, C3, C6, C7, C11, and C13 have their flux reversed. Upon closure of the read-out circuit, the negative pulse generated across the setting winding S of each of these cores thus causes transfer leads A1, A3, A6, A7, A11, and A13 to receive a brief negative pulse. Thus, the corresponding flip-flops are switched and the collectors of the right hand transistors swing negative. This negative voltage is impressed upon output leads D1, D3, D6, D7, D11, and D13. Only one of the "and" gates is connected to this particular group of output leads and hence it will be the only "and" gate to be operated. Assuming that "and" gate 110A is the operative one, negative blocking potential is impressed upon diodes 116A. As a result of all of the diodes being blocked, the base 121A of translating transistor 120A swings negative. Since this transistor is of the PNP type, as are all of the transistors used in this circuit, it is rendered conductive and its associated translating relay 130A is operated.

As mentioned previously, each translating relay has a group of contacts 133A, B, etc. associated therewith. When operated, this translating relay connects battery potential via these contacts and leads 134A, B, etc. to routing directive storage unit marking leads 138. Leads 134A, 134B, etc., are strapped to leads 138 in coded combinations such that the proper routing directive is stored in storage unit 5 for every office code received by the register. Therefore, when translating relay 130A operates responsive to the registration of office code 212, contacts 133A of translating relay 130A mark leads 138 to store the proper group of routing digits in routing directive storage unit 5.

Routing directive storage unit of sender 5 may use transistor-type registers similar to those disclosed in my U.S. Patent 2,882,345. Alternatively, the storage unit may be similar to the office code storage unit 55 as disclosed in the present application. However, since the number of routing digits may be greater than the number of digits in the office code, storage unit of sender 5 may need a larger capacity than storage unit 55. This routing directive storage unit, in conjunction with the directory number storage unit (not shown) provides complete storage facilities for all of the digits to be transmitted by the sender. It is to be noted that storage unit of sender 5 and directory number storage unit are individually associated with the register unit.

It will be recalled that read-out of cores C1–C15, inclusive, was effected upon application of battery to their serially connected windings R, and that during this read-out process, the information contained in the marked cores was destroyed. This destroyed information, or other appropriate information, may be rewritten in storage unit 55 by using another set of contacts on the translating relay, for example contacts 131A on translating relay 130A, which connect resistance battery back into input leads A1 through A15.

Also upon the operation of relay 130A, contact 132A opens, interrupting the chain circuit including relay 100 in the translator an relay 80 in the register-sender. Relay 80 restores and at contact 81 removes battery from the serially connected windings R of the storage cores. As soon as this occurs, the battery connected via contacts 131A, leads 135A, transfer leads A1–A15 to the selected ones of setting windings S of cores C1–C15 is effective to again set these cores. Relay 80, in restoring, at its contact 82, restores relay 90 which disconnects the translator from the register sender, thereby disconnecting the flip-flops from the rewrite battery potential applied to the cores by contacts 131A. Relay 100 in the translator restores removing, at contact 101, the remaining ground from flip-flops 160 to 300, thus rendering all of them monostable. The operated flip-flops now return to their normal monostable condition, i.e., with their right hand transistors conducting. Relay 130A restores due to its "and" gate 110A being blocked by the resetting of the flip-flops and the translator is available again for use by the same or another register-sender.

The sender portion of the register-sender then transmits the routing directive. In the event an all trunk busy condition is encountered at any point in the switch train as it is being set-up, usually over a plurality of offices, in response to the routing digits and a corresponding busy signal returned over this train, relay 140 in the register-sender operates under the control of the busy signal receiving means (not shown) to break the holding path for relay 60 at contact 141. Relay 60 restores and in so doing enables this resgister-sender to again seize the translator when it is available assuming, of course, that the calling party is still holding this register-sender. Upon this second seizure of the translator, the foregoing operations will be repeated since the original information has been rewritten in the storage unit.

However, since in most multi-office telephone networks there is usually more than one path over which a call may be routed, it may be desirable to provide for alternate routing in the event the preferred route is busy. If such alternative trunking is desired, the contacts 131A of translating relay 130A are strapped to write an office code number different from the originally dialled one into storage unit 55. It should be understood that this different office code merely provides for an alternative route to the originally dialled office designation, i.e., the corresponding code must not be assigned as a regular office code. In this case, if the register-sender on the first attempt receives an all trunks busy signal over the switch train, relay 140 upon operation restores relay 60 at 141, the register-sender again seizes the translator, the cores are read out, but now another translating relay, say translating relay 130B, operates since a different combination of flip-flops have operated in response to the alternative office code. This results in storage of a new set of routing digits in routing directive storage unit 5. The sender then transmits this new set of digits.

If it is desired that, in case the connection cannot be completed over the above alternative route, a third attempt be made over still another route, contacts 131B may be strapped to write the office code digits for this third route into storage unit 55. In this case, if the second route is busy, the register-sender is arranged by means of relay 141 to again seize the translator and the routing directive for the third route is passed on to storage unit 5 by the translator. If only three routes are available or desired, the contacts 131C (not shown) of translating relay 130C (not shown) may be strapped to insert the original set of office code digits in storage unit 55. Thus, a cycling effect is produced, that is, the sender tries a first path, then a second path, and then a third path, and if none of these is available, the sender tries the first path again, etc.

The above rewrite feature may also be advantageously used in ticketing systems. In this case the register-sender is arranged to feed the rewritten information into a ticketer at the completion of the call.

In the event the calling party abandons the call before its completion, some of the cores C1—C15 will remain marked. However, as previously described, these cores will be reset upon a subsequent seizure of the register-sender. If the calling party hangs up before dialling the complete office code, a circuit for automatically "homing" wipers W1 and W2 of rotary switch 45 will be completed. This circuit extends over battery, motor magnet 48, interrupter spring contact 49, off-normal cam contact 59, contact 75, contact 54 and ground. This circuit will be broken by the operation of off-normal contact 59 on steps 13 and 22, but motor magnet 48 will then operate from ground connected to these bank contacts of switch bank 47. This circuit extends from battery, motor magnet 48, interrupter spring contact 49, contact 22, contact 73, switch wiper W2 to ground in either position 11 or 22. Here again, false markings of the cores may occur, but these will be erased upon subsequent seizure of the register-sender.

While the invention has been described with a certain degree of particularity, it is apparent that numerous modifications may be made without departing from the true spirit and scope of the invention as defined in the claims.

What is claimed is:

1. In a telephone system, a register-sender arrangement comprising a register, in which recorded information corresponding to the destination of one call only is stored at any one time, means for extracting and receiving said recorded information from said register for transmission by said sender of digits corresponding to said destination, the recording of said information being destroyed incident to said extraction, and means controlled by said receiving means for automatically re-recording information corresponding to said destination back in said register for re-use in a subsequent transmission of destination digits by said sender.

2. In a telephone system, the arrangement as claimed in claim 1, in which said register includes a plurality of cores for magnetically recording said information, said recorded information being destroyed upon read-out.

3. In a telephone system, the arrangement as claimed in claim 1, wherein said receiving means comprises a translator for converting at least a part of said destination information into predetermined routing digits.

4. In a telephone system, a plurality of register-senders, each comprising: a register of the type in which the recorded information corresponding to the destination of one call only is stored at any one time; means for extracting said recorded information from said register; translating means provided in common to and selectively connected with one of said plurality of register-senders for converting the office code part of the recorded information as extracted from said selectively connected register into predetermined routing digits for transmission by the corresponding sender, said part of the recorded information being destroyed incident to said extraction; and means controlled by said translating means for automatically re-recording information corresponding to said office code back in said register for re-use in a subsequent transmission of routing digits by said sender.

5. In a telephone system, a register-sender arrangement and switching equipment operated under the control of said sender, said register comprising means for recording information corresponding to the destination of a call, said arrangement including apparatus controlled by said switching equipment for causing digits corresponding to said destination to be repeatedly transmitted to said switching equipment, said apparatus comprising means for extracting and receiving said recorded digits from said register for transmission by said sender of destination digits, the recording of said information being destroyed incident to said extraction, and means controlled by said receiving means for automatically re-recording information corresponding to said destination back in said register for re-use in a subsequent transmission of destination digits by said sender.

6. In a telephone system, an arrangement for converting a plurality of received decimal digits into a corresponding plurality of coded digits comprising: a single rotary stepping switch having a plurality of contact banks each including a number of sections; a first circuit for advancing said switch directively, in response to the series of impulses corresponding to one of the received decimal digits, to a rotary position in the section of said banks associated with said one digit, the wiring of the plurality of bank contacts in said position determining the code to be formed; and a second circuit for automatically advancing said switch in the interdigital period from the aforementioned position to a position at the beginning of the next-following bank section, preparatory to the further directive advancement of said switch in response to the receipt of the next series of impulses.

7. In a telephone system, the arrangement as claimed in claim 6, being further provided with a plurality of storage means each for individually registering the corresponding one of said plurality of coded digits, each said storage means being connected with the contacts in the section of said contact banks which is associated with said digit, whereby said decimal digits are sequentially registered by said switch in coded form in the storage means individually associated with said digits.

8. In a telephone system, the arrangement as claimed in claim 7 wherein each said storage means comprises a plurality of magnetic storage cores.

9. In a telephone system, the arrangement as claimed in claim 7, wherein the bank contacts in each of said first-mentioned switch positions are so interconnected by said wiring that each said digit is recorded in a two-out-of-five code in the corresponding storage means.

10. In a telephone system, a register-translator- sender arrangement comprising: storage means, means for converting a series of received decimal digits into a corresponding series of coded digits and sequentially recording said coded digits in said storage means; means for simultaneously extracting all said coded digits from said storage means in such a way that the recording of said coded digits in said storage means is destroyed incident to said extraction; means for translating said extracted coded digits into a predetermined set of routing digits to be transmitted by said sender and for again writing coded digits corresponding to said series of received decimal digits into said storage means; and means for causing the last-mentioned coded digits to be extracted from said storage means and passed to said translator for renewed translation into a set of routing digits to be transmitted by said sender.

11. In a telephone system, the register-translator-sender arrangement as claimed in claim 10, wherein said converting and sequential recording means comprises: a single rotary stepping switch having a plurality of contact banks each including a number of sections; a first circuit for advancing said switch directively, in response to the series of impulses corresponding to one of the received decimal digits, to a rotary position in the section of said banks associated with said one digit, the wiring of the plurality of bank contacts in said position determining the code to be formed; and a second circuit for automatically advancing said switch in the interdigital period from the aforementioned position to a position at the beginning of the next-following bank section, preparatory to the further directive advancement of said switch in response to the receipt of the next series of impulses.

12. In a telephone system, the register-translator-sender arrangement as claimed in claim 10, wherein there is provided cross-connecting means from said translating means to said storage means for re-recording the original series of coded digits in said storage means.

13. In a telephone system, the register-translator-sender arrangement as claimed in claim 10, wherein there is provided cross-connecting means from said translating means to said storage means for recording in said storage means in the event the connection cannot be completed under the control of the original set of routing digits, an alternative set of coded digits for causing said sender, upon extraction of the last-mentioned digits, to transmit a corresponding alternative set of routing digits under the control of said translating means.

14. In a telephone system, switching equipment and register-sender apparatus; said apparatus comprising storage means, first recording means for receiving each individual one of a plurality of decimal digits determinative of the destination of a call and to convert each of said decimal digits into a corresponding coded digit; second recording means for receiving a plurality of coded digits determinative of the destination of a call; first circuit connections between said first recording means and said storage means and second circuit connections between said second recording means and said storage means; means for causing said first recording means to write said first-mentioned coded digits, one digit after the other, into said storage means by way of said first connections, alternatively operable means for causing said second recording means to write all of said second-mentioned coded digits simultaneously into said storage means by way of said second connection, and sending means controlled by the coded digits stored in said storage means for transmitting a plurality of digits to said switching equipment.

15. In a telephone system, the register as claimed in tclaim 14, wherein said storage means comprises a plurality of magnetic cores for each digit to be stored.

No references cited.